US010048001B2

(12) United States Patent
Butts (10) Patent No.: US 10,048,001 B2
(45) Date of Patent: Aug. 14, 2018

(54) SYSTEM AND METHOD FOR REDUCING NITROGEN CONTENT OF GSP/EXPANDER PRODUCT STREAMS FOR PIPELINE TRANSPORT

(71) Applicant: Butts Properties, Ltd., Midland, TX (US)

(72) Inventor: Rayburn C. Butts, Midland, TX (US)

(73) Assignee: Butts Properties, Ltd., Midland, TX (US)

( * ) Notice: Subject to any disclaimer, the term of this patent is extended or adjusted under 35 U.S.C. 154(b) by 0 days.

(21) Appl. No.: 15/635,719

(22) Filed: Jun. 28, 2017

(65) Prior Publication Data

US 2017/0336139 A1   Nov. 23, 2017

Related U.S. Application Data

(62) Division of application No. 13/546,532, filed on Jul. 11, 2012, now Pat. No. 9,726,426.

(51) Int. Cl.
*F25J 3/02* (2006.01)
*F25J 3/08* (2006.01)

(52) U.S. Cl.
CPC .......... *F25J 3/0257* (2013.01); *F25J 3/0209* (2013.01); *F25J 3/08* (2013.01)

(58) Field of Classification Search
CPC ........ F25J 3/0257; F25J 3/0233; F25J 3/0209; F25J 3/0214; F25J 2210/42; F25J 2220/44
See application file for complete search history.

(56) References Cited

U.S. PATENT DOCUMENTS

| | | | |
|---|---|---|---|
| 4,451,275 A | 5/1984 | Vines et al. | |
| 4,504,295 A | 3/1985 | Davis et al. | |
| 4,609,390 A | 9/1986 | Wilson | |
| 4,664,686 A | 5/1987 | Pahade et al. | |
| 4,746,342 A | 5/1988 | DeLong et al. | |
| 4,758,258 A * | 7/1988 | Mitchell ............... | F25J 3/0209 62/639 |
| 4,767,428 A * | 8/1988 | Apffel .................. | C07C 7/04 62/623 |
| 4,948,403 A * | 8/1990 | Lepperhoff ........... | F01N 3/027 55/282 |
| 5,051,120 A | 9/1991 | Pahade et al. | |
| 5,141,544 A | 8/1992 | Butts | |
| 5,257,505 A | 11/1993 | Butts | |
| 5,375,422 A | 12/1994 | Butts | |
| 6,401,486 B1 | 6/2002 | Lee et al. | |
| 6,758,060 B2 | 7/2004 | O'Brien | |
| 7,793,517 B2 | 9/2010 | Patel et al. | |

(Continued)

FOREIGN PATENT DOCUMENTS

WO   WO2010109228   9/2010

*Primary Examiner* — Brian King
(74) *Attorney, Agent, or Firm* — Ross Barnes LLP; Robin L. Barnes (57) ABSTRACT

A system and method for removing nitrogen from an intermediate stream in a gas subcooled process operation that processes natural gas into a sales gas stream and a natural gas liquids stream. The system and method of the invention are particularly suitable for use with gas subcooled process operations where the sales gas stream exceeds pipeline nitrogen specifications by up to about 3%, such as for reducing the nitrogen content of sales gas streams to levels permissible for pipeline transport.

12 Claims, 6 Drawing Sheets

(56) References Cited

U.S. PATENT DOCUMENTS

| | | | |
|---|---|---|---|
| 7,818,979 B2 | 10/2010 | Patel et al. | |
| 7,856,847 B2 | 12/2010 | Patel et al. | |
| 9,003,829 B2 | 4/2015 | Bauer et al. | |
| 2006/0144081 A1* | 7/2006 | Paradowski | F25J 3/0209 62/620 |
| 2007/0157663 A1 | 7/2007 | Mak et al. | |
| 2009/0100862 A1 | 4/2009 | Wilkinson et al. | |
| 2011/0174017 A1 | 7/2011 | Victory et al. | |
| 2011/0277500 A1* | 11/2011 | Bauer | F25J 3/0209 62/630 |

* cited by examiner

SYSTEM AND METHOD FOR REDUCING NITROGEN CONTENT OF GSP/EXPANDER PRODUCT STREAMS FOR PIPELINE TRANSPORT

CROSS REFERENCE TO RELATED APPLICATIONS

This application is a divisional of U.S. application Ser. No. 13/546,532 filed on Jun. 11, 2012.

BACKGROUND OF THE INVENTION

1. Field of the Invention

This invention relates to a system and method for separating nitrogen from methane and other components of natural gas streams being processed into a sales gas stream and a natural gas liquids (NGL) stream by the known gas subcooled/expander process (GSP/expander process or simply GSP). The system and method of the invention are particularly suitable for use in connection with natural gas streams where the processed sales gas stream contains nitrogen in an amount that exceeds pipeline specifications.

2. Description of Related Art

Nitrogen contamination is a frequently encountered problem in the production of natural gas. Transporting pipelines typically do not accept natural gas containing more than about 4 mole percent inerts, such as nitrogen. Estimates indicate that as much as 25% of natural gas in the United States exceeds a typical 4% pipeline specification. To correct this problem, the sales gas may be mixed or diluted with other gas to achieve the desired nitrogen specification. Alternatively, known methods of nitrogen removal such as a nitrogen rejection unit or NRU comprised of two cryogenic fractionating columns, as described in U.S. Pat. Nos. 4,451,275 and 4,609,390 or comprised of a single fractionating column, as described in U.S. Pat. Nos. 5,141,544, 5,257,505, and 5,375,422 may be used. However, dilution and full-blown NRU installation and operation are expensive for the gas processor. Additionally, a complete stand-alone NRU, which is capable of removing large percentages of nitrogen, may not be necessary or economically feasible for a gas subcooled process where the sales gas exceeds the nitrogen specification by only a small amount.

SUMMARY OF THE INVENTION

The system and method disclosed herein facilitate the economically efficient removal of nitrogen from methane by modifying a conventional GSP system and its method of operation for nitrogen removal. The system and method of the invention are particularly suitable for use where the feed gas to a conventional GSP and expander system contains sufficient nitrogen and other inerts that the resultant sales gas contains a higher percentage of nitrogen (or inerts) than is permitted by the operating specifications of a particular pipeline. For example, conventional GSP processing of raw natural gas normally containing 3-10% nitrogen may produce a sales gas that exceeds the nitrogen specification set by the transporting pipeline by up to 3% (that is, sales gas nitrogen contents of about 6-7%, with a typical pipeline specification being around 3-4% nitrogen). Through use of the present invention, the nitrogen content of the sales gas can be reduced to levels that are acceptable for pipeline transport at a capital cost and with horsepower requirements that are significantly lower than those required by use of a conventional stand-alone NRU unit.

According to one embodiment of the invention, a system and method are disclosed for strategically integrating an NRU into a typical GSP/expander operation. According to known GSP methods, a subcooler reduces the temperature of a process stream prior to feeding the top of a demethanizer column. Through use of this embodiment of the invention, a portion of the process stream that normally feeds the top of the demethanizer column after passing through the subcooler serves as the NRU feed gas stream. The NRU feed stream passes through a single fractionating column and other processing equipment to produce a treated gas stream with reduced nitrogen content. That treated gas stream is then reintroduced into the typical GSP operation as a portion of the feed to the top of the demethanizer column for further processing. The result is a processed sales gas (or residue gas) stream having a nitrogen content within typical pipeline specifications without adversely impacting the production of NGL product.

There are several advantages to the system and method disclosed herein not previously achievable by those of ordinary skill in the art using existing technologies. These advantages include, for example, an ability to produce sales gas meeting typical pipeline specifications for nitrogen content without diluting the sales gas prior to transport and without requiring any additional dehydration or carbon dioxide removal prior to processing the gas for removal of nitrogen. Although the present system and method has the disadvantage of higher capital costs associated with additional equipment for the NRU and higher operating costs for that equipment, compared to a GSP operation without an NRU, the costs of such are sufficiently offset by the savings in having sales gas within pipeline specification and savings in operating costs achieved by strategically placing the NRU within the GSP operation to take advantage of inter-operational efficiencies, such as heat exchange between process stream. Additionally, the costs of the NRU according to the present system are reduced as compared to either a two-column or single column NRU operated externally to the GSP system. Such known NRU systems have higher capital and operating costs associated with various pieces of equipment typically used in such systems, such as the additional fractionating column (in the two-column system), equipment to remove water and carbon dioxide, and multiple heat exchangers. The capital costs and operating expenditures for implementing the system and method of the present invention are believed to be around 25-50% of the costs of conventional full-blown, stand-alone NRU systems. Additionally, the NRU system and method of the present invention do not substantially interfere with NGL production and may enhance NGL recovery over a GSP system without the NRU system and method of the present invention.

Those of ordinary skill in the art will appreciate upon reading this disclosure that references to separation of nitrogen and methane used herein refer to processing NRU feed gas to produce various multi-component product streams containing large amounts of the particular desired component, but not pure streams of any particular component. One of those product streams is a rejected nitrogen stream, which is primarily comprised of nitrogen but may have small amounts of other components, such as methane and ethane. Another product stream is an intermediate stream, which is primarily comprised of methane but may have small amounts of other components, such as nitrogen, ethane, and propane, that feeds the GSP demethanizer column to produce a sales gas stream within pipeline specifications.

Those of ordinary skill in the art will also appreciate upon reading this disclosure that additional processing sections for removing carbon dioxide, water vapor, and possibly other components or contaminants that are present in the GPS feed stream or NRU feed stream, can also be included in the system and method of the invention, depending upon factors such as, for example, the origin and intended disposition of the product streams and the amounts of such other gases, impurities or contaminants as are present in the GSP feed stream or NRU feed stream. However, additional removal of carbon dioxide and water vapor from the NRU feed stream are not needed to achieve a sales gas stream within pipeline specifications and the system and method of the invention will not be adversely impacted by the presence of small amounts of such contaminants in the NRU feed stream.

BRIEF DESCRIPTION OF THE DRAWINGS

The system and method of the invention are further described and explained in relation to the following drawings wherein.

DESCRIPTION OF PREFERRED EMBODIMENTS

Figure 1:
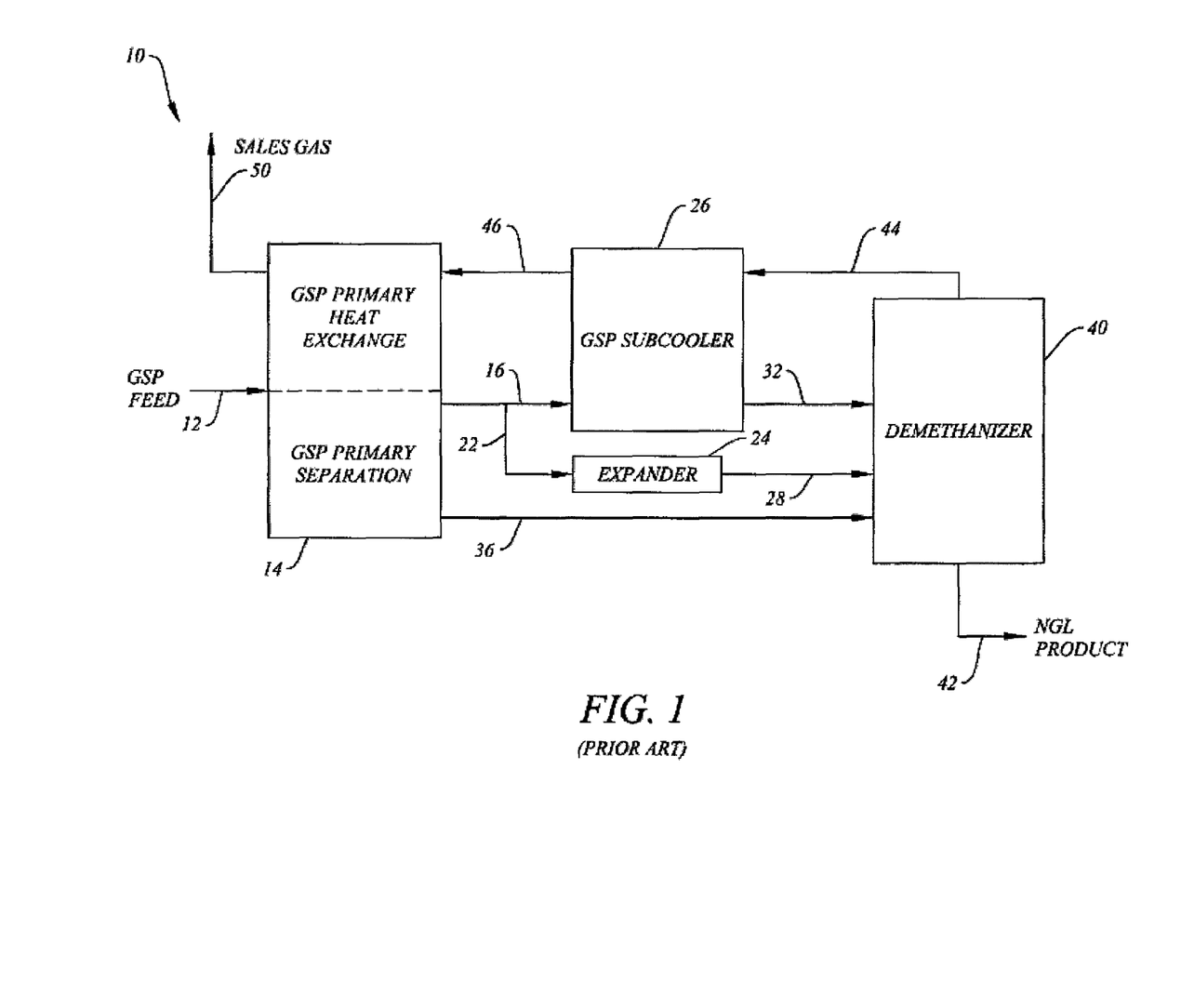
FIG. 1 is a simplified process flow diagram illustrating principal processing stages of a typical prior art GSP/expander operation.

FIG. 1 (prior art) depicts the basic processing stages of a known GSP/expander system 10. GSP feed gas 12 is fed through GSP primary heat exchange and primary separation block 14 and exits as streams 16 and 36. GSP primary heat exchange and primary separation block 14 contains one or more separators, one or more heat exchangers, a compressor for compressing the sales gas 50 and other equipment (such as valves, splitters, and mixers), which are known to those of ordinary skill in the art. Stream 36 feeds a demethanizer column 40 and stream 16 passes through a GSP subcooler 26, exiting as stream 32 which also feeds demethanizer column 40. Stream 22, split off from stream 16 passes through expander 24, exiting as stream 28 which also feed demethanizer column 40. The demethanizer column 40 produces an NGL product stream 42 and an overhead stream 44. Overhead stream 44 passes through GSP subcooler 26, exiting as stream 46, which then passes through the heat exchangers and compressor in block 14, exiting as sales gas stream 50, containing primarily methane. Depending on the composition of the GSP feed stream 12, the resulting sales gas stream 50 may contain too much nitrogen to meet pipeline specifications. For example, a GSP feed stream 12 containing 4% nitrogen would result in a sales gas stream 50 with a nitrogen content in excess of 4%, requiring further processing or dilution to meet pipeline specifications.

Figure 2:
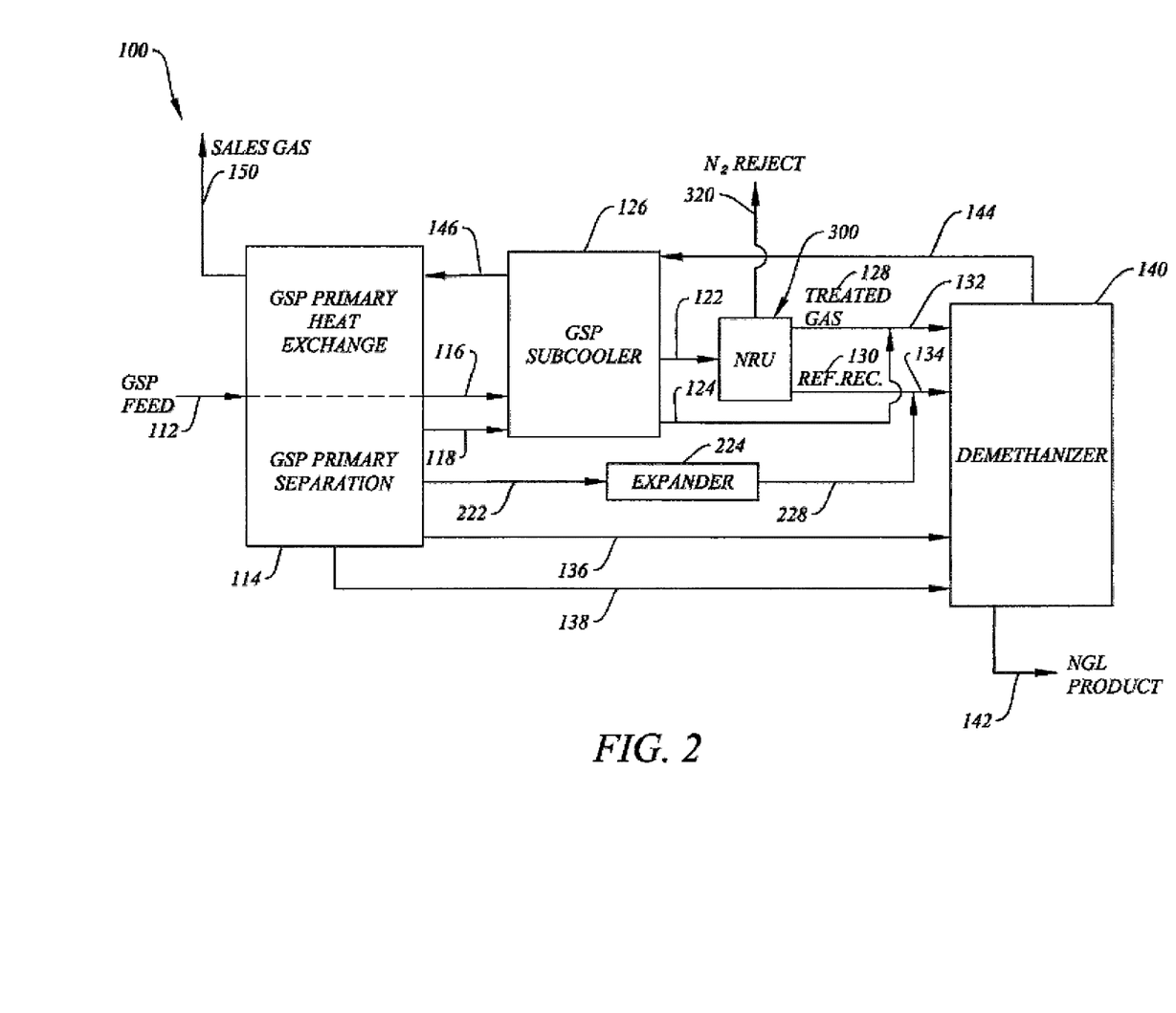
FIG. 2 is a simplified process flow diagram illustrating principal processing stages of an embodiment of a system and method for separating nitrogen from process streams in a GSP/expander operation.
Figure 3:
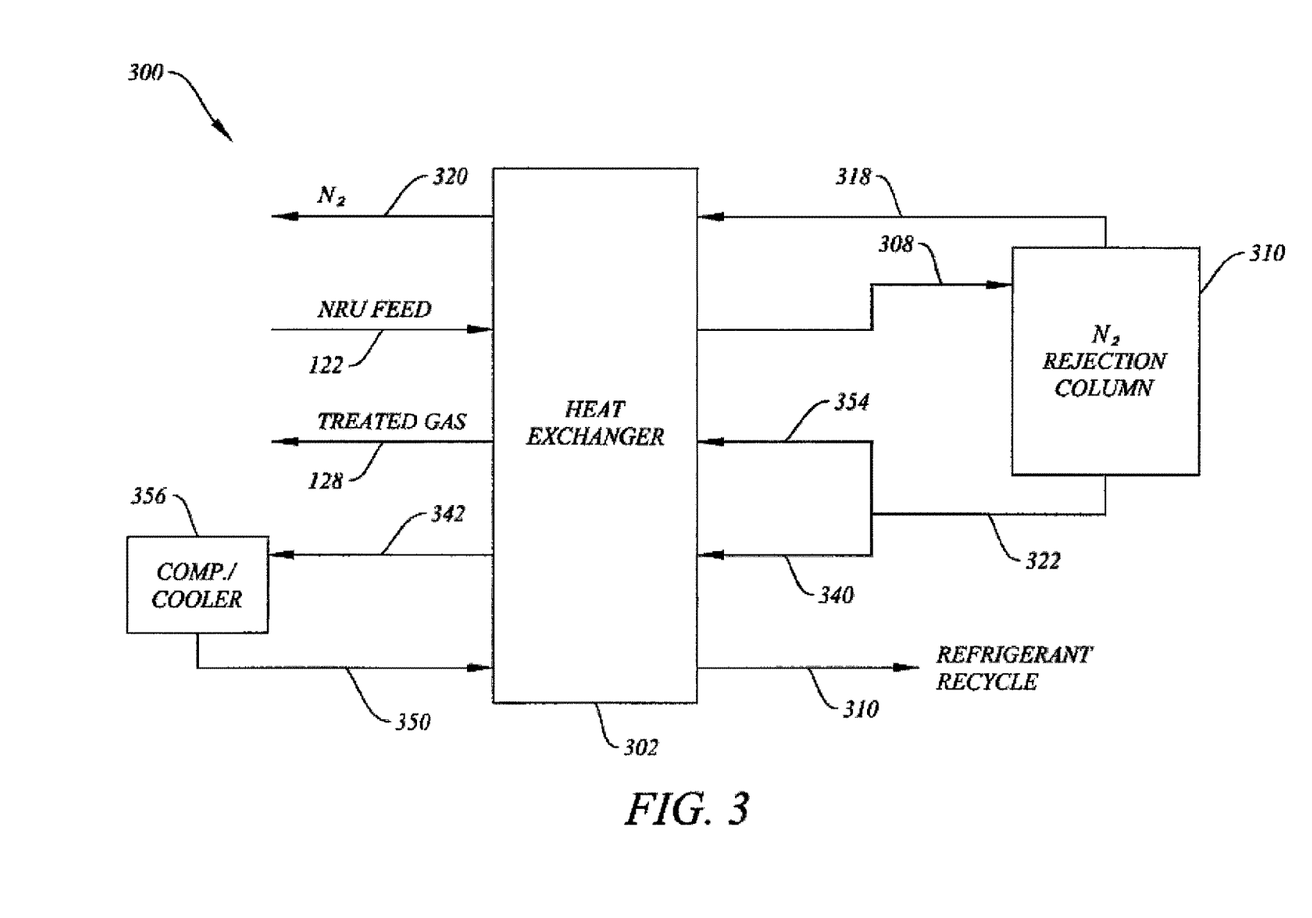
FIG. 3 is a simplified process flow diagram illustrating principal processing stages of the NRU portion of an embodiment of a system and method for separating nitrogen from process streams in a GSP/expander operation.

FIG. 2 depicts the basic processing stages of the system and method according to a preferred embodiment of the invention. The system 100 comprises processing equipment typically found in GSP operations, with a few modifications to permit insertion of NRU system 300 in the process as described more fully below. System 100 of the invention includes processing block 114, which contains the GSP primary heat exchanger(s) (one or more) and primary separators(s) (one or more) and a compressor, as well as other equipment (such as valves, splitters, and mixers), known to be used in a typical GSP operation. GSP feed stream 112 passes through GSP primary processing block 114, exiting as streams 116, 118, 222, 136, and 138. Streams 116 and 118 pass through GSP subcooler 126, exiting as cooled streams 122 and 124. Stream 122 is the feed stream for NRU system 300. Two streams, treated gas stream 128 and refrigerant recycle stream 130, are returned to system 100 after processing in NRU system 300, as depicted in FIG. 3. Cooled stream 124 is mixed with treated gas stream 128 to form stream 132, which feeds a demethanizer column 140. Stream 228 mixes with refrigerant recycle stream 130 to form stream 134, which also feeds demethanizer column 140. Streams 136 and 138 also feed demethanizer column 140. The demethanizer column 140 produces an NGL product stream 142 and an overhead stream 144. The overhead stream 144 passes through GSP subcooler 126, exiting as stream 146, which then passes through the heat exchanger(s) and compressor in block 114, exiting as sales gas stream 150, containing primarily methane. For a GSP feed stream containing around 4% nitrogen, the sales gas stream 150 will only contain around 3% nitrogen, which is within typical pipeline specifications.

FIG. 3 depicts the basic processing stages of the NRU portion of the system and method according to a preferred embodiment of the invention. The NRU system 300 comprises a heat exchanger 302, a nitrogen rejection column 310, and a refrigerant recycle block 356, as well as other equipment (such as valves, separators, and mixers, which are not depicted in FIG. 3). Stream 122 exiting GSP subcooler 126, (depicted in FIG. 2) feeds the NRU heat exchanger 302 and exits as cooled stream 308, which feeds nitrogen rejection column 310. Nitrogen rejection column 310 produces overhead stream 318 and bottom stream 322. Overhead stream 318 passes through heat exchanger 302, exiting as warmed nitrogen vent stream 320. Bottom stream 322 is split into streams 354 and 340, both of which pass through heat exchanger 302. Stream 354 is warmed, exiting as treated gas stream 128, which is returned to system 100 for further processing. Stream 340 is also warmed, exiting as stream 342, which passes through refrigerant recycle block 356 before returning to heat exchanger 302 as stream 350 and exits as refrigerant recycle stream 130. The cooled refrigerant recycle stream is returned to system 100 for further processing.

Figure 4:
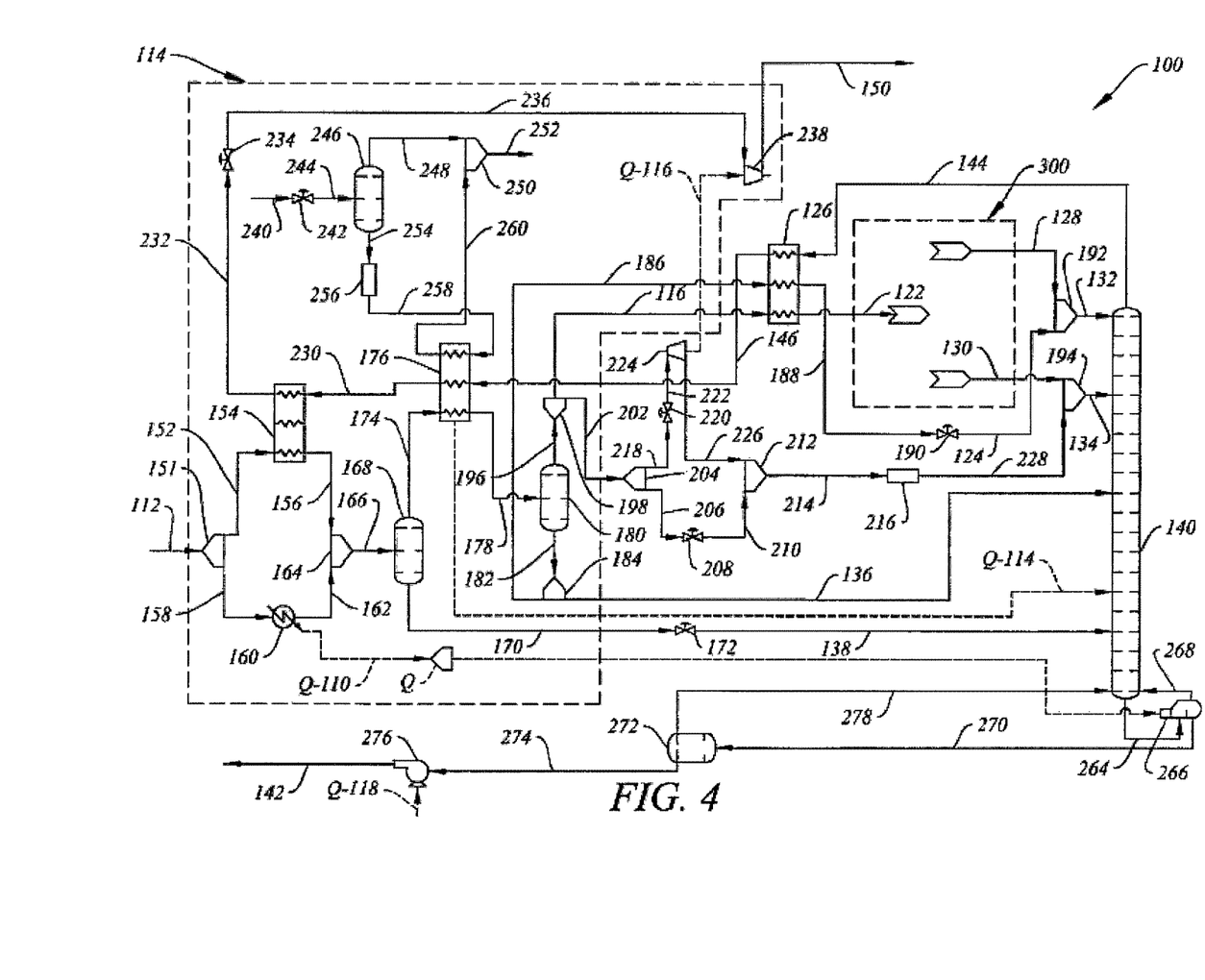
FIG. 4 is a more detailed process flow diagram illustrating the processing stages of the simplified process flow diagram of FIG. 2.
Figure 5:
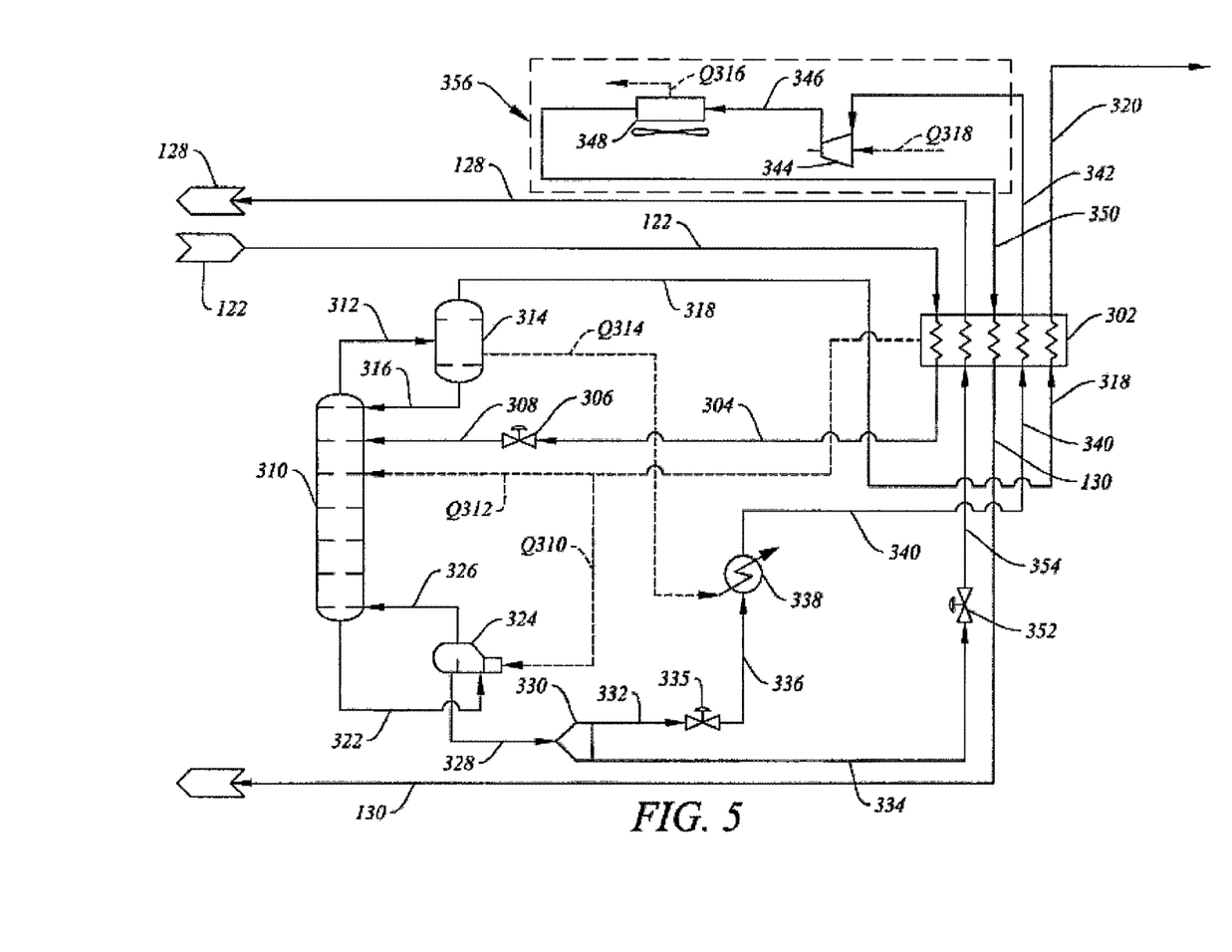
FIG. 5 is a more detailed process flow diagram illustrating the NRU processing stage of the simplified process flow diagram of FIG. 3.

Systems 100 and 300 are depicted in greater detail in FIGS. 4 and 5. Referring to FIG. 4, a 100 MMSCFD GSP feed stream 112 containing approximately 4% nitrogen and 70% methane at 120° F. and 750 psig is split into streams 152 (67.5%) and 158 (32.5%) by splitter 151. Stream 152 passes through heat exchanger 154 from which it emerges as stream 156, having been cooled to 72° F. This cooling is the result of heat exchange with another process stream, 230, discussed later. Stream 158 passes through heat exchanger 160 and exits as stream 162, having been cooled to 30.6° F. Streams 156 and 162 are mixed together by mixer 164 to form stream 166 at 57.3° F. and 743 psig.

Stream 166 feeds a first separator 168 to produce a first overhead vapor stream 174 and a first bottom liquid stream 170. Bottom stream 170 has a flow rate of approximately 1.9 MMSCFD at 738 psig and 57° F., which drops to 265 psig and 31.2° F. after exiting Joule-Thomson (JT) valve 172 as stream 138. Stream 138, containing 0.52% nitrogen, feeds a lower stage of demethanizer column 140. JT valve 172 is capable of cooling by the well-known Joule-Thomson effect, but in post-start up, steady state operation the valve provides less actual thermal cooling, but does provide the necessary pressure reduction for stream 138 prior to feeding demethanizer column 140. Overhead stream 174 has a flow rate of approximately 98 MMSCFD at 738 psig and 57° F. before passing through heat exchanger 176 to exit as stream 178 at −40° F. This cooling is the result of heat exchange with process streams 146 (discussed below) and stream 258, which originates from a second process feed stream 240. Stream 240 contains 97% propane at 36° F. and 60 psig and passes through JT valve 242, exiting as stream 244 having been cooled by expansion to −35° F. and a pressure of 3.6 psig. Stream 244 feeds a vertical stand pipe 246, where the vapor rises and exits as stream 248 and the liquid exits the bottom of stand pipe 246 as stream 254. Stream 254 has a volumetric flow rate of 276.7 sgpm as it passes through a length of vertical pipe 256 exiting as stream 258, with a slight increase in pressure. Stream 258 passes through heat exchanger 176 and exits as stream 260, having been warmed to 10° F. Stream 260 mixes with vapor stream 248 in mixer 250 forming stream 252 at −9.5° F. and 3.6 psig.

After exiting heat exchanger 176, stream 178 feeds a second separator 180 to produce a second overhead vapor stream 196 and a second bottom liquid stream 182. Second bottom stream 182, with a flow rate of approximately 31 MMSCFD at 733 psig and −40° F., is split into stream 136 (99.99%) and 186 (0.01%) by splitter 184. Stream 136, containing 1% nitrogen, feeds demethanizer column 140. Stream 186 passes through GSP subcooler 126, exiting as stream 188. Stream 188, at 728 psig and −97.7° F., passes through a second JT valve 190, exiting as stream 124, at 215 psig and −121° F. Stream 124 mixes with treated gas stream 128 (from NRU system 300) in mixer 192 to form stream 132. Stream 132, at a flow rate of 26.6 MMSCFD and containing around 0.5% nitrogen, feeds the top of demethanizer column 140 at 210 psig and −162.2° F.

Second overhead stream 196 exits second separator 180 with a flow rate of approximately 67.2 MMSCFD at 733 psig and −40° F. Stream 196 is split into stream 202 (45%) and stream 116 (55%) by splitter 198. Stream 116 passes through GSP subcooler 126, exiting as NRU feed stream 122. Stream 202 may be split into stream 206 and stream 218 by splitter 204; however, in this example of a preferred embodiment of the system and method of according to the invention, the entirety of stream 202 is directed to stream 218. Valve 220 controls stream 218, but stream 220 exits valve 220 as stream 222 at substantially the same temperature and pressure as stream 218. Stream 222 passes through expander 224 and exits as stream 226, with the pressure having dropped from 730 psig to 225 psig. If stream 206 is used, it passes through a third JT valve 208, exiting as stream 210. Stream 210 would then be mixed with stream 226 in mixer 212 to form stream 214. Stream 214 flows through a length of pipe (depicted as 216), over which there is a slight pressure drop, becoming stream 228. Stream 228, at a flow rate of 30.2 MMSCFD and containing around 5.5% nitrogen, mixes with refrigerant recycle stream 130 (from NRU system 300), at a flow rate of 8.2 MMSCFD and containing around 0.5% nitrogen, in mixer 194 to form stream 134. Stream 134, at a flow rate of 38.4 MMSCFD and containing around 4.4% nitrogen, feeds demethanizer column 140.

Demethanizer column 140 separates feed streams 132, 134, 136, and 138 into overhead stream 144 and bottoms stream 264. Stream 264 from the bottom of the demethanizer column 140 is directed to reboiler 266 that receives heat (designated as energy stream Q-110) from heat exchanger 160. Stream 264 is at approximately 15.4° F. and 206 psig and contains a negligible amount of nitrogen, 2.6% methane, 58.3% ethane, and 29.6% propane. The demethanizer column 140 also receives heat from heat exchanger 176, designated by energy stream Q-114. Liquid stream 270 exits reboiler 266 and feeds separator 272 where it is separated into an NGL stream 274 and a vapor stream 278. Stream 274 passes through pump 276, exiting as an NGL product stream 142 at approximately 49° F. and 1200 psig and 470 sgpm. NGL product stream 142 contains a negligible amount of nitrogen, 52.8% ethane, 34% propane, and 1% methane, and is suitable for sale or further processing. Pump 276 requires an energy input, designated as Q-118. Vapor stream 278 at 0.035 MMSCFD, 34.2° F., 205 psig and containing 7.9% methane is recycled to the bottom of demethanizer column 140. Vapor stream 268, containing 7.9% methane, exits reboiler 266 at 34.4° F., 206 psig and is also recycled to the bottom of demethanizer column 140.

Overhead stream 144 exits demethanizer column 140 at −147.5° F. and 200 psig, with a volumetric flow rate of 73.4 MMSCFD, and containing approximately 2.9% nitrogen, 94.5% methane, and 2.5% ethane. Stream 144 passes through subcooler 126, exiting as stream 146, having been warmed to −50° F. Stream 146 then passes through heat exchanger 176, exiting as stream 230, having been warmed to 44.5° F. Stream 230 then passes through heat exchanger 154, exiting as stream 232, having been warmed to 109.7° F. Stream 232 passes through a JT valve 234, exiting as stream 236 having a slight drop in pressure. Stream 236 passes through compressor 238 (powered by energy from expander 224, designated by energy stream Q-116) exiting as sales gas stream 150. Sales gas stream 150 is at 133° F. and 207.7 psig and contains 2.9% nitrogen, making it suitable for sale within typical pipeline specifications. In a typical GSP operation, a feed stream nitrogen content of around 4% would result in a sales gas nitrogen content greater than 4%, falling outside most pipeline specifications. In this preferred embodiment of the invention, the sales gas stream 150 nitrogen content is reduced from the feed stream nitrogen content by slightly more than 1%. This reduction in nitrogen is possible by the addition of the NRU system 300, depicted in FIG. 5.

Referring to FIG. 5, NRU feed stream 122, containing 5.5% nitrogen and having a temperature of −97.7° F. and a pressure of 728 psig enters NRU system 300. According to this embodiment of the present invention, it is not necessary to remove water vapor or carbon dioxide from the NRU feed stream 122, although additional steps and equipment may be added to do so if desired. Methods for removing water vapor, carbon dioxide, and other contaminants are generally known to those of ordinary skill in the art and are not described herein. NRU feed stream 122 passes through heat exchanger 302 exiting as stream 304, having been cooled to −185° F. Stream 304 passes through JT valve 306, reducing the pressure of exiting stream 308 to 250 psig. Stream 304 feeds nitrogen rejection column 310. Stream 322 exits the bottom of nitrogen rejection column 310, containing 1% nitrogen, and feeds virtual reboiler 324. Although depicted in FIG. 5 as a separate piece of equipment, preferably virtual reboiler 324 is part of other process equipment as will be understood by those of ordinary skill in the art. Vapor stream 326, containing 2.8% nitrogen and 96.6% methane, exits virtual reboiler 324 and is fed back into the bottom of nitrogen rejection column 310. Liquid stream 328, containing 0.5% nitrogen, 87% methane and 9.9% ethane exits virtual reboiler 234 at −159° F. and 253 psig. Stream 328 is split into stream 332 (23.5%) and stream 334 (76.5%) by splitter 330.

Stream 332 passes through JT valve 335 and exits as stream 336 having been cooled by expansion to −240° F., with a pressure of 12 psig. Stream 336 passes through virtual condenser 338 and exits as stream 340, warmed to −210° F. Stream 340 passes through heat exchanger 302 and exits as stream 342 warmed to 90° F. Stream 342 feeds a refrigerant recycle system 356, first passing through compressor 344 (supplied by energy stream Q-318) and exiting as stream 346 at a temperature of 573° F. and a pressure of 225 psig. Stream 346 passes through cooler 348 (releasing energy stream Q-316) and is cooled to 120° F. as exiting stream 350. Stream 350 passes through heat exchanger 302, exiting as refrigerant recycle stream 130 at −90° F. and 215 psig. Refrigerant recycle stream 130 is returned to system 100 for further processing as described above.

Stream 334 passes through JT valve 352, with a pressure drop of 38 psig and a decrease in temperature of around 7° F. as it exits as stream 354. Stream 354 passes through heat exchanger 302, exiting as treated gas stream 128. Treated gas stream 128 contains only 0.5% nitrogen, compared to the 5.5% nitrogen in NRU feed stream 122. Treated gas stream 128 is returned to system 100 for further processing as discussed above.

Vapor stream 312 exits the top of nitrogen rejection column 310, having a temperature of −203° F. and a pressure of 250 psig and containing 57.5% nitrogen. Stream 312 feeds internal condenser 314 (which is depicted as exterior to NRU column 310). Heat released from internal condenser 314 (designated as energy stream Q-314) supplies virtual condenser 338. Liquid stream 316 exits internal condenser 314 and is feed back into NRU rejection column 310. Vapor stream 318, at −232° F., passes through heat exchanger 302, exiting as rejected nitrogen stream 320, warmed to 90° F. Rejected nitrogen stream 320 contains 85% nitrogen, 15% methane, and negligible amounts of ethane and propane. The heat released from heat exchanger 302 supplies heat to nitrogen rejection column 310 (designated as energy stream Q-312) and virtual reboiler 324 (designated as energy stream Q-310).

EXAMPLE

The flow rates, temperatures and pressures of various flow streams referred to in connection with the discussion of the system and method of the invention in relation to FIGS. 4 and 5, for a GSP feed stream flow rate of 100 MMSCFD and containing 4% nitrogen, 70% methane, 14.7% ethane, and 8.4% propane appear in Table 1 below. The values for the energy streams referred to in connection with the discussions of the system and method of the invention in relation to FIGS. 4 and 5 appear in Table 2 below. The values discussed herein and in the tables below are approximate values.

TABLE 1

FLOW STREAM PROPERTIES

| Stream Reference Numeral | % $N_2$ | % $CH_4$ | % $C_2H_6$ | % $C_3H_8$ | Flow Rate (lbmol/h) | Temperature (deg. F.) | Pressure (psig) |
|---|---|---|---|---|---|---|---|
| 112 | 4 | 69.9 | 14.8 | 8.4 | 10979.8 | 120 | 750.3 |
| 116 | 5.5 | 82.8 | 9.3 | 2.2 | 4057.2 | −40 | 733.3 |
| 122 | 5.5 | 82.8 | 9.3 | 2.2 | 4057.2 | −97.7 | 728.3 |
| 124 | 1 | 44.8 | 46.4 | 20.6 | 0.34 | −121.1 | 215 |
| 128 | 0.5 | 87 | 9.9 | 2.3 | 2919.1 | −162.2 | 210 |
| 130 | 0.5 | 87 | 9.9 | 2.3 | 899.6 | −90 | 215 |
| 132 | 0.5 | 87 | 9.9 | 2.4 | 2919.5 | −162.2 | 210 |
| 134 | 4.4 | 83.7 | 9.4 | 2.2 | 4219.1 | −109.5 | 215 |
| 136 | 1 | 44.8 | 26.4 | 20.6 | 3395.2 | −40 | 733.3 |
| 138 | 0.5 | 22.4 | 18.8 | 26.7 | 207.6 | 31.2 | 265 |
| 142 | neg. | 1 | 52.8 | 34.1 | 2686 | 49.1 | 1200 |
| 144 | 2.9 | 94.5 | 2.5 | 0.04 | 8055.4 | −147.5 | 200 |
| 146 | 2.9 | 94.5 | 2.5 | 0.04 | 8055.4 | −50 | 195 |
| 150 | 2.9 | 94.5 | 2.5 | 0.04 | 8055.4 | 133.4 | 207.8 |
| 152 | 4 | 69.9 | 14.8 | 8.4 | 7412.6 | 119.9 | 748.3 |
| 156 | 4 | 69.9 | 14.8 | 8.4 | 7412.6 | 72 | 743.3 |
| 158 | 4 | 69.9 | 14.8 | 8.4 | 3567.3 | 119.9 | 748.3 |
| 162 | 4 | 69.9 | 14.8 | 8.4 | 3567.3 | 30.6 | 743.3 |
| 166 | 4 | 69.9 | 14.8 | 8.4 | 10979.8 | 57.3 | 743.3 |
| 170 | 0.5 | 22.4 | 18.8 | 26.7 | 207.61 | 57 | 738.3 |
| 174 | 4.1 | 70.8 | 14.7 | 8 | 10772.2 | 57 | 738.3 |
| 178 | 4.1 | 70.8 | 14.7 | 8 | 10772.2 | −40 | 733.3 |
| 182 | 1 | 44.8 | 26.4 | 20.6 | 3395.56 | −40 | 733.3 |
| 188 | 1 | 44.8 | 26.4 | 20.6 | 0.34 | −97.7 | 728.3 |
| 186 | 1 | 44.8 | 26.4 | 20.6 | 0.34 | −40 | 733.3 |
| 196 | 5.5 | 82.8 | 9.3 | 2.2 | 7376.6 | −40 | 733.3 |
| 202 | 5.5 | 82.8 | 9.3 | 2.2 | 3319.5 | −40 | 733.3 |
| 214 | 5.5 | 82.8 | 9.3 | 2.2 | 3319.5 | −113.1 | 225 |
| 218 | 5.5 | 82.8 | 9.3 | 2.2 | 3319.5 | −40 | 733.3 |
| 222 | 5.5 | 82.8 | 9.3 | 2.2 | 3319.5 | −40.2 | 730.3 |
| 226 | 5.5 | 82.8 | 9.3 | 2.2 | 3319.5 | −113.1 | 225 |
| 228 | 5.5 | 82.8 | 9.3 | 2.2 | 3319.5 | −113.7 | 221.7 |
| 230 | 2.9 | 94.5 | 2.5 | 0.04 | 8055.4 | 44.5 | 190 |
| 232 | 2.9 | 94.5 | 2.5 | 0.04 | 8055.4 | 109.7 | 185 |
| 236 | 2.9 | 94.5 | 2.5 | 0.04 | 8055.4 | 109.4 | 180 |
| 240 | 0 | 0 | 1.5 | 97 | 2861.9 | 36.3 | 60.3 |
| 244 | 0 | 0 | 1.5 | 97 | 2861.9 | −35 | 3.6 |
| 248 | 0 | 0 | 2.8 | 96.6 | 1276.4 | −35 | 3.6 |
| 252 | 0 | 0 | 1.5 | 97 | 2861.9 | −9.5 | 3.6 |
| 254 | 0 | 0 | 0.5 | 97.3 | 1585.5 | −35 | 3.6 |
| 258 | 0 | 0 | 0.5 | 97.3 | 1585.5 | −35 | 4.8 |
| 260 | 0 | 0 | 0.5 | 97.3 | 1585.5 | 10.2 | 3.8 |
| 264 | neg. | 2.6 | 58.3 | 29.6 | 3495.3 | 15.4 | 206 |
| 268 | neg. | 8 | 76.3 | 14.4 | 805.4 | 34.5 | 206 |
| 270 | neg. | 1 | 52.9 | 34.1 | 2689.9 | 34.5 | 206 |
| 274 | neg. | 1 | 52.8 | 34.1 | 2686 | 34.2 | 205 |
| 278 | neg. | 7.9 | 76.3 | 14.4 | 3.9 | 34.2 | 205 |
| 304 | 5.5 | 82.8 | 9.3 | 2.2 | 4057.2 | −185 | 723.3 |
| 308 | 5.5 | 82.8 | 9.3 | 2.2 | 4057.2 | −184.4 | 250.3 |
| 312 | 57.6 | 42.4 | neg. | neg. | 968.3 | −203 | 249.8 |
| 316 | 48.6 | 51.4 | neg. | neg. | 729.9 | −232.2 | 249.8 |
| 318 | 85 | 15 | neg. | neg. | 238.4 | −232.2 | 249.8 |
| 320 | 85 | 15 | neg. | neg. | 238.4 | 90 | 244.8 |
| 322 | 1 | 89.3 | 7.7 | 1.8 | 4981.2 | −162.2 | 252.8 |
| 326 | 2.8 | 96.6 | 0.6 | 0.02 | 1162.4 | −159.1 | 252.8 |
| 328 | 0.5 | 87 | 9.9 | 2.3 | 3818.8 | −159.1 | 252.8 |
| 332 | 0.5 | 87 | 9.9 | 2.3 | 899.6 | −159.1 | 252.8 |
| 334 | 0.5 | 87 | 9.9 | 2.3 | 2919.1 | −159.1 | 252.8 |
| 336 | 0.5 | 87 | 9.9 | 2.3 | 899.6 | −239.9 | 12 |
| 340 | 0.5 | 87 | 9.9 | 2.3 | 899.6 | −210 | 10 |
| 342 | 0.5 | 87 | 9.9 | 2.3 | 899.6 | 90 | 5 |
| 346 | 0.5 | 87 | 9.9 | 2.3 | 899.6 | 573.1 | 225 |
| 350 | 0.5 | 87 | 9.9 | 2.3 | 899.6 | 120 | 220 |
| 354 | 0.5 | 87 | 9.9 | 2.3 | 2919.1 | −466 | 215 |

TABLE 2

ENERGY STREAM REPORT

| Energy Stream Reference Numeral | Energy Rate (Btu/h) | Power (hp) | From | To |
|---|---|---|---|---|
| Q-110 | 5.27E+06 | 2070.3 | Heat Exchanger 160 | Reboiler 266 |
| Q-114 | 4E+06 | 1572.1 | Heat Exchanger 176 | Demeth. Column 140 |
| Q-116 | 1.65E+06 | 649.2 | Expander 224 | Compressor 238 |
| Q-118 | 967034 | 380.1 | — | Pump 276 |
| Q-310 | 3.05E+06 | 1200 | Heat Exchanger 302 | Virtual Reboiler 324 |
| Q-312 | 500000 | 196.5 | Heat Exchanger 302 | $N_2$ Reject. Column 310 |
| Q-314 | 1.8E+06 | 706.4 | Internal Condenser 314 | Virtual Condenser 338 |
| Q-316 | 4.75E+06 | 1865.7 | Cooler 348 | — |
| Q-318 | 4.88E+06 | 1918.7 | — | Compressor 344 |

Those of ordinary skill in the art will appreciate upon reading this disclosure that the values discussed above are based on the particular parameters and composition of the feed stream in the Example, and that the values can differ depending upon differences in operating conditions and upon the parameters and composition of the GSP feed stream 112 and the NRU feed stream 122.

Figure 6:
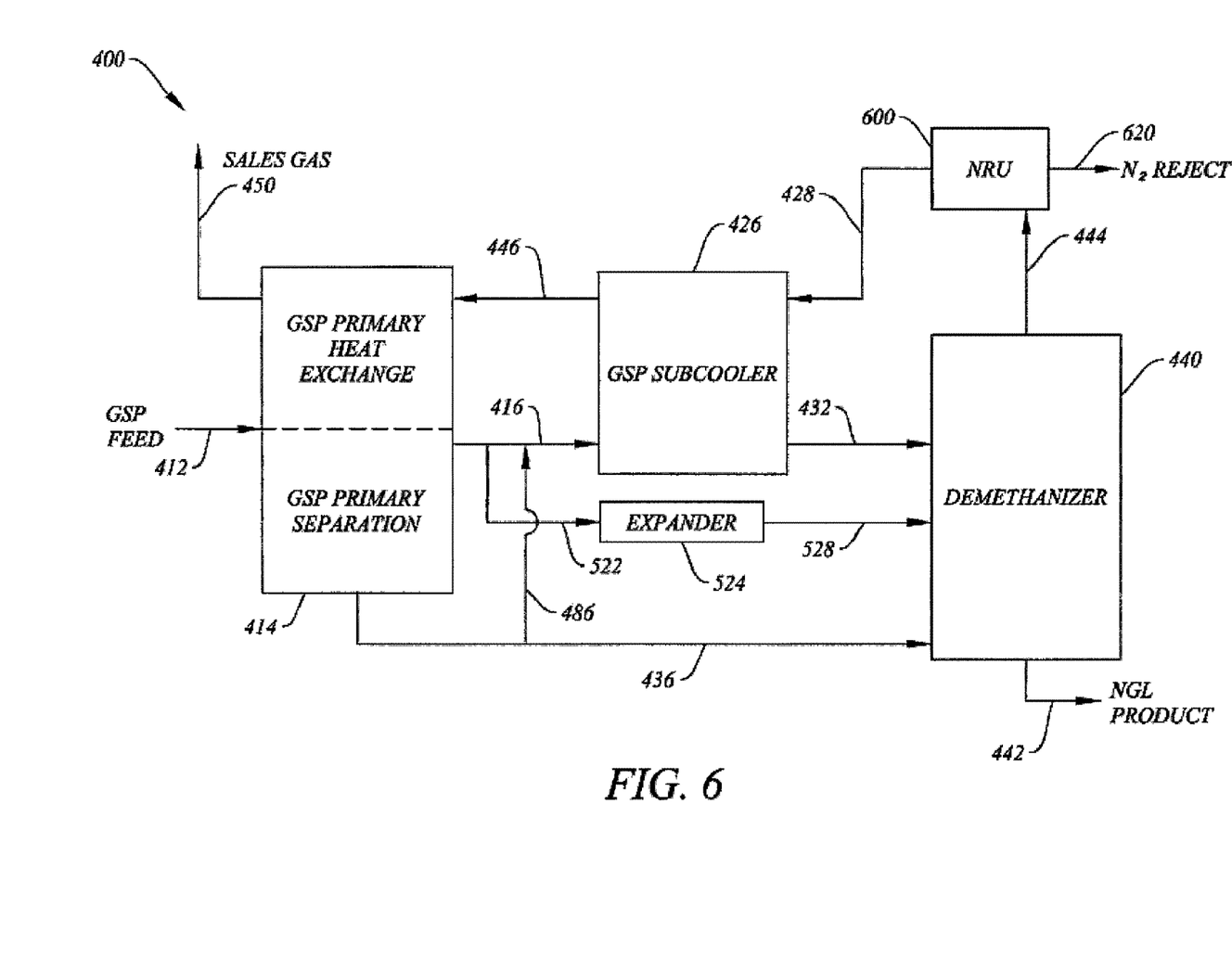
FIG. 6 is a simplified process flow diagram illustrating principal processing stages for another embodiment of the system and method for separating nitrogen from process streams in a GSP/expander operation.

FIG. 6 depicts the basic processing stages of another embodiment of the invention, wherein the NRU processing stage 600 is located in an alternate location compared to the NRU processing stage 300 as depicted in FIGS. 2 and 4. The system 400 comprises processing equipment typically found in GSP operations, with a few modifications to permit insertion of system 600 in the process, as will be understood by those of ordinary skill in the art. System 400 of the invention includes processing block 414, which contains the GSP primary heat exchanger(s) (one or more) and primary separator(s) (one or more) and a compressor, as well as other equipment (such as valves, splitters, and mixers), known to be used in a typical GSP operation. GSP feed stream 412 passes through GSP primary processing block 414, exiting as streams 416 and 436. A portion of stream 436 is split off into stream 486, with the remainder of stream 436 feeding demethanizer column 440. A portion of stream 116 is split off into stream 522, which passes through expander 524 exiting as stream 528. Stream 528 also feeds demethanizer column 440. The remainder of stream 116 is mixed with stream 486 before passing through GSP subcooler 426, exiting as cooled stream 432, which also feeds demethanizer column 440. The demethanizer column 440 produces an NGL product stream 442 and an overhead stream 444. The overhead stream 444 feeds NRU processing stage 600. Treated gas stream 428 and a nitrogen reject stream 620 exit NRU processing stage 600. Treated gas stream 428 passes through subcooler 426, exiting as stream 446. Stream 446 then passes through the heat exchanger(s) and compressor in block 414, exiting as sales gas stream 450, containing primarily methane. For a GSP feed stream containing around 4% nitrogen, the sales gas stream 450 will only contain around 3% nitrogen, which is within typical pipeline specifications. NRU processing stage 600 is similar to NRU processing stage 300 depicted in FIG. 5.

Those of ordinary skill in the art will appreciate upon reading the disclosure in light of the accompanying drawings that the system and method of the present invention can be used with expander configurations known to be used in GSP operations other than those depicted in the drawings and described herein. Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

I claim:

1. A system for removing nitrogen from a feed stream comprising nitrogen, methane, ethane, and other components to produce a methane product stream, the system comprising:
   a first separator wherein the feed stream is separated into a first overhead stream and a first bottoms stream;
   a second separator wherein the first overhead stream is separated into a second overhead stream and a second bottoms stream;
   a first splitter for splitting the second bottoms stream into a first portion and a second portion;
   a first fractionating column wherein a first portion of the second overhead stream is separated into a third overhead stream and a third bottoms stream;
   a second fractionating column wherein the first bottoms stream, the first portion of the second bottoms stream, the second portion of the second bottoms stream; a second portion of the second overhead stream, and the third bottoms stream are separated into a fourth overhead stream and a fourth bottoms stream;
   a first heat exchanger for cooling at least a portion of the feed stream prior to the first separator through heat exchange with the fourth overhead stream;
   a second heat exchanger for cooling the first overhead stream through heat exchange with the fourth overhead stream;
   a subcooler for cooling the first portion of the second overhead stream prior to entering the first fractionating column and for cooling a first portion of the second bottoms stream prior to entering the second fractionating column through heat exchange with the fourth overhead stream;
   a third heat exchanger for cooling the first portion of the second overhead stream after the subcooler and prior to entering the first fractionating column through heat exchange with the third bottoms stream and the third overhead stream;
   an expander for expanding at least part of the second portion of the second overhead stream prior to feeding the second fractionating column; and
   a compressor for compressing the fourth overhead stream to produce a methane product stream.

2. The system of claim 1 further comprising a Joule-Thomson valve for reducing the pressure of the first portion of the second overhead stream after the third heat exchanger and prior to entering the first fractionating column.

3. The system of claim 2 wherein the pressure of the first portion of the second overhead stream is between about 200 psig and about 300 psig when the first portion of the second overhead stream enters the first fractionating column.

4. The system of claim 1, further comprising a second splitter for splitting the third bottoms stream into a first portion and a second portion prior to entering the third heat exchanger and wherein both the first portion of the third bottoms stream and the second portion of the third bottoms stream pass through the third heat exchanger.

5. The system of claim 4, wherein the feed stream comprises up to about 10% nitrogen and the first portion of the third bottoms stream comprises up to about 2% nitrogen.

6. The system of claim 4, further comprising a compressor and a cooler for compressing and cooling the second portion of the third bottoms stream after the second portion of the third bottoms stream passes through the third heat exchanger and wherein the second portion of the third bottoms stream is recycled through the third heat exchanger after being cooled by the cooler and prior to entering the second fractionating.

7. The system of claim 6, further comprising a third splitter for splitting the second overhead stream into the first portion and the second portion of the second overhead stream.

8. The system of claim 7 further comprising a first mixer for mixing the first portion of the third bottoms stream with the first portion of the second bottoms stream after passing through the subcooler and prior to entering the second fractionating column.

9. The system of claim 8 further comprising a second mixer for mixing the second portion of the second overhead stream with the second portion of the third bottoms stream after being recycled through the third heat exchanger and prior to entering the second fractionating column.

10. The system of claim 4, further comprising a Joule-Thomson valve for reducing the pressure of the second portion of the of the third bottoms stream prior to entering the third heat exchanger.

11. The system of claim 1 wherein the feed stream comprises up to about 10% nitrogen, the methane product stream comprises up to about 4% nitrogen, and the third overhead stream comprises at least about 80% nitrogen.

12. The system of claim 1 wherein energy is released from the third heat exchanger and wherein at least a portion of the energy released from the third heat exchanger is supplied to an intermediate stage of the first fractionating column.

\* \* \* \* \*